US011981409B2

(12) United States Patent
Skutnik

(10) Patent No.: US 11,981,409 B2
(45) Date of Patent: May 14, 2024

(54) SYSTEM, APPARATUS, AND METHOD FOR STORING ELONGATED OBJECTS

(71) Applicant: Daniel Vincent Skutnik, Portage, MI (US)

(72) Inventor: Daniel Vincent Skutnik, Portage, MI (US)

(*) Notice: Subject to any disclaimer, the term of this patent is extended or adjusted under 35 U.S.C. 154(b) by 89 days.

(21) Appl. No.: 17/738,374

(22) Filed: May 6, 2022

(65) Prior Publication Data
US 2022/0355910 A1 Nov. 10, 2022

Related U.S. Application Data

(60) Provisional application No. 63/186,252, filed on May 10, 2021.

(51) Int. Cl.
*B63C 15/00* (2006.01)
*B60P 3/10* (2006.01)
(52) U.S. Cl.
CPC ............ *B63C 15/00* (2013.01); *B60P 3/1066* (2013.01)
(58) Field of Classification Search
CPC ....... B63C 15/00; B60P 3/1066; B63B 32/83; A63B 71/0036; A63B 2071/025; A63B 2069/068; A63B 2208/0204; A47F 7/0035; A47B 81/00
See application file for complete search history.

(56) References Cited

U.S. PATENT DOCUMENTS

| | | | |
|---|---|---|---|
| 3,610,431 A | 10/1971 | Rodden | |
| 4,630,990 A * | 12/1986 | Whiting | B60R 9/042 224/310 |
| 5,096,216 A | 3/1992 | McCalla | |
| 5,161,561 A * | 11/1992 | Jamieson | A45B 23/00 248/156 |
| 5,236,095 A * | 8/1993 | Krizka | A47B 47/00 211/96 |
| 5,318,175 A * | 6/1994 | Stevens | A47G 25/0664 211/205 |
| 5,377,849 A * | 1/1995 | Martin | A63B 71/0036 D6/552 |
| D394,926 S * | 6/1998 | Lindsay | D6/552 |
| 5,931,320 A | 8/1999 | Gajda | |
| 6,257,261 B1 * | 7/2001 | Johnson | B60R 9/08 224/406 |
| 6,390,309 B1 | 5/2002 | Tucker | |
| 6,758,448 B1 * | 7/2004 | Williams | A47B 96/02 248/125.1 |

(Continued)

OTHER PUBLICATIONS

Store Your Board website page https://www.storeyourboard.com/8-sup-and-kayak-storage-rack-freestanding-log-rack/?gclid=EAlalQobChMlmM6RuMuU9wIVSvbjBx1TxwpYEAQYASABEgK8mvD_BwE , visited Apr. 14, 2022.

*Primary Examiner* — Ko H Chan
(74) *Attorney, Agent, or Firm* — Keefe IP Law, PLLC

(57) ABSTRACT

A method for storing a watercraft above a surface portion is disclosed. The method includes permanently attaching a first base member to the surface portion at a first location, permanently attaching a second base member to the surface portion at a second location that is spaced at a distance from the first location, removably attaching a first support assembly to the first base member, and removably attaching a second support assembly to the second base member. The distance is less than a length of the watercraft.

20 Claims, 9 Drawing Sheets

(56) References Cited

U.S. PATENT DOCUMENTS

| | | | |
|---|---|---|---|
| 7,418,918 B2* | 9/2008 | Bierbower | B63B 17/02 |
| | | | 114/361 |
| 7,963,530 B1* | 6/2011 | Garcia | B62B 3/02 |
| | | | 280/30 |
| 7,980,185 B1* | 7/2011 | Teague, Jr. | E05G 1/02 |
| | | | 109/51 |
| 8,002,126 B1* | 8/2011 | Drum | A47B 43/00 |
| | | | 211/195 |
| 9,326,325 B2* | 4/2016 | Lev | H05B 3/34 |
| 10,471,980 B1* | 11/2019 | Jordan | B62B 3/16 |
| 10,729,226 B1* | 8/2020 | Zamora | A45F 3/44 |
| 2003/0178382 A1 | 9/2003 | Tucker | |
| 2004/0163336 A1* | 8/2004 | Hsu | E04H 12/2223 |
| | | | 52/157 |
| 2006/0186073 A1 | 8/2006 | Roe | |
| 2006/0272687 A1* | 12/2006 | Tanner | E04H 12/2223 |
| | | | 248/530 |
| 2014/0129485 A1 | 5/2014 | Fisher | |
| 2018/0093151 A1* | 4/2018 | Burdan | A63B 71/0672 |
| 2018/0257748 A1 | 9/2018 | Gugin | |

\* cited by examiner

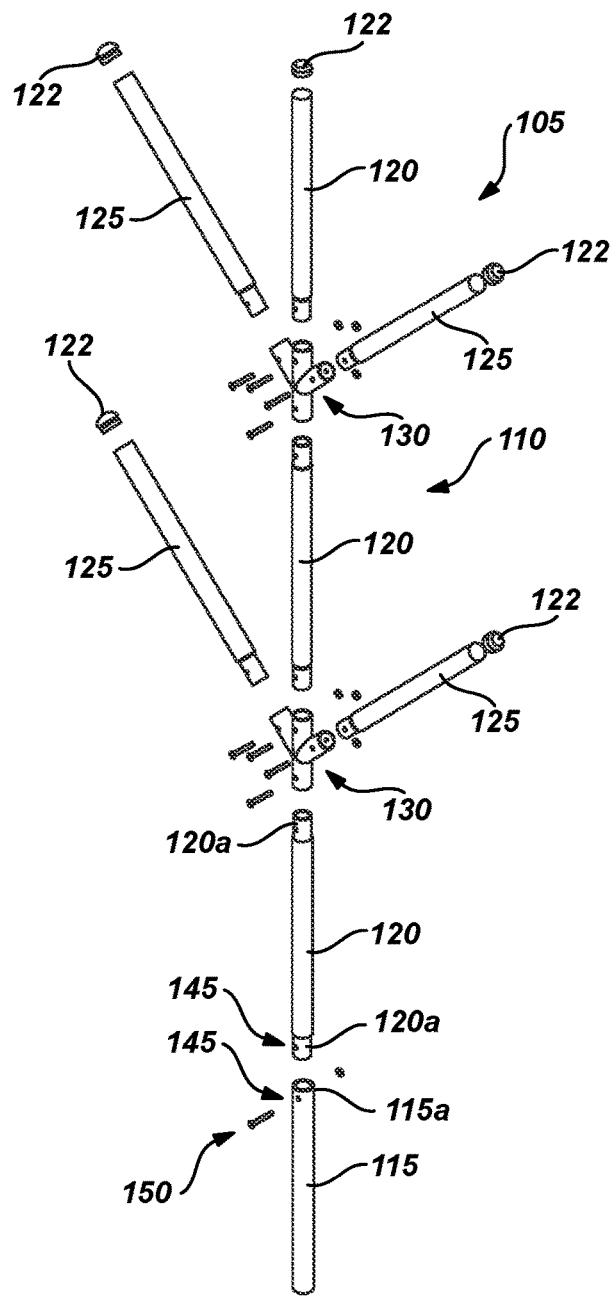
Fig. 2
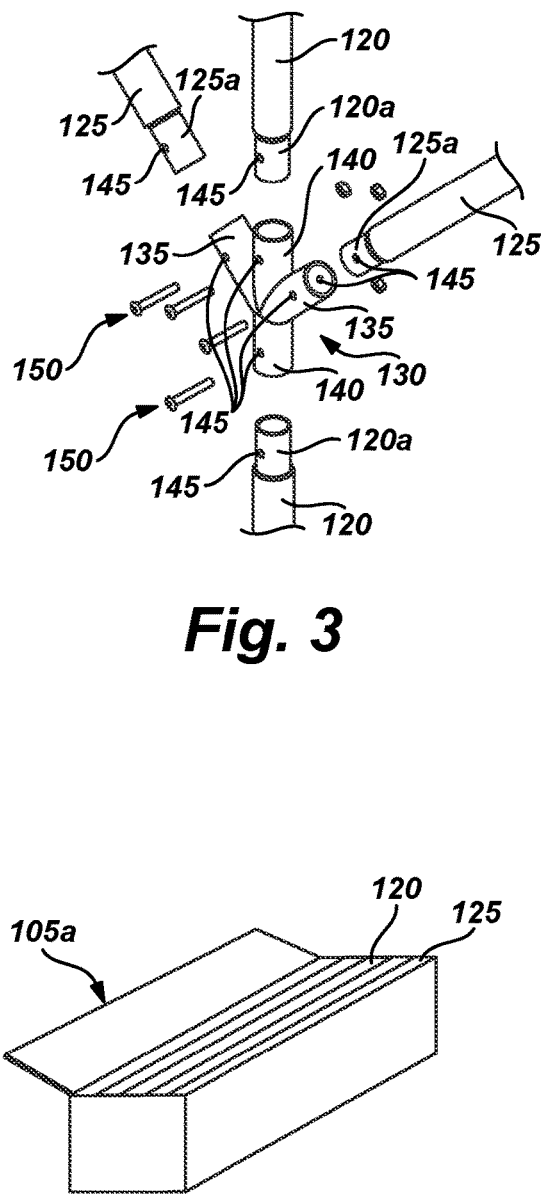
Fig. 3
Fig. 2A

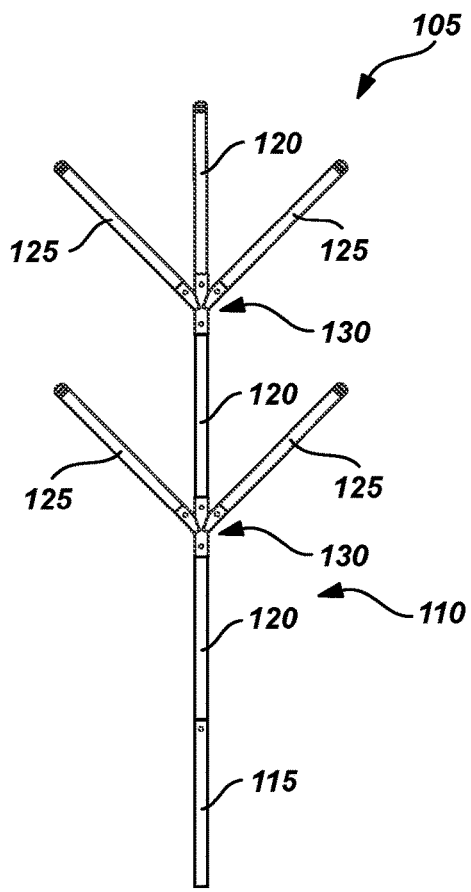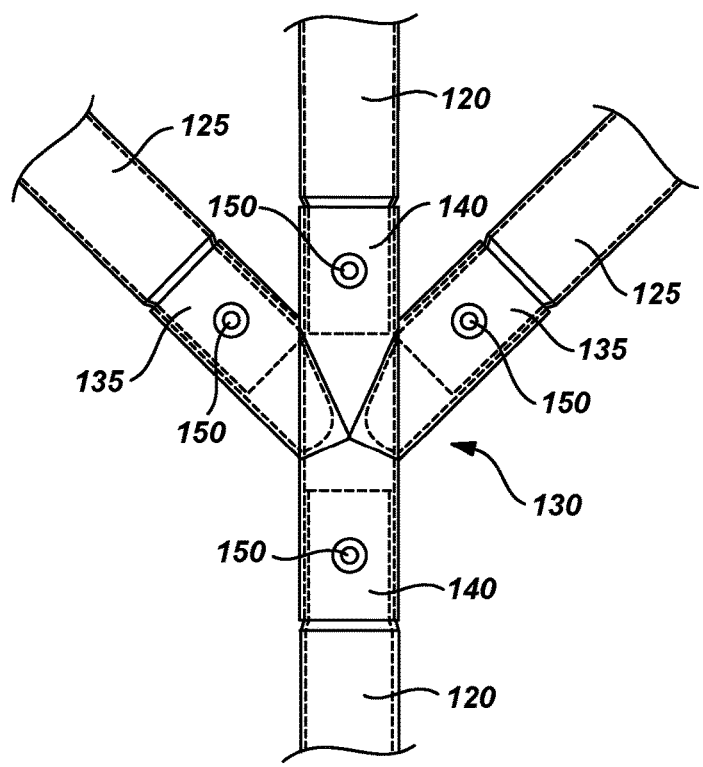
Fig. 4A  Fig. 4B

SYSTEM, APPARATUS, AND METHOD FOR STORING ELONGATED OBJECTS

RELATED APPLICATIONS

This application claims the benefit of U.S. Provisional Patent Application No. 63/186,252 filed on May 10, 2021, which is hereby incorporated by reference in its entirety.

TECHNICAL FIELD

The present disclosure generally relates to a system, apparatus, and method for storing objects, and more particularly to a system, apparatus, and method for storing elongated objects such as watercraft.

BACKGROUND

The popularity of personal watercraft such as kayaks, paddle boards, and canoes has increased significantly over the last decade. However, storing such personal watercraft off the ground poses difficulties to users. For example, leaving personal watercraft on the ground may accelerate aging and deterioration, attract dirt and unwanted pests or animals, and cause water to pond or accumulate. Further, improperly stored watercraft may be unsecured and thereby stolen, take up significant space, and may be difficult to work around.

Conventional systems for storing watercraft often involve an existing standing wall or large support structure, which may not be available in many situations. Conventional systems also often involve a relatively large footprint, which may not be practical for many users and/or households. Commercial storage systems may be prohibitively expensive and take up excessive space to provide a practical solution for personal use.

Some conventional storage solutions are made of wood and have a large, relatively bulky supporting structure to support the weight of a rack system as well as the supported watercraft. Wood is typically not weather-resistant and such relatively bulky support systems may be difficult for users to manage due to the size and weight of the supporting structure.

U.S. patent publication number 2018/0257748 to Gugin (the '748 publication) attempts to address some of the above shortcomings in the prior art by providing a personal watercraft storage rack. However, the '748 publication discloses a system utilizing an existing structure such as a dock, which may not be available to many users and/or at many locations. Accordingly, the system of the '748 publication may not be used in many locations such as locations having no existing structures.

The exemplary disclosed system, apparatus, and method of the present disclosure are directed to overcoming one or more of the shortcomings set forth above and/or other deficiencies in existing technology.

SUMMARY OF THE DISCLOSURE

In one exemplary aspect, the present disclosure is directed to a method for storing a watercraft above a surface portion. The method includes permanently attaching a first base member to the surface portion at a first location, permanently attaching a second base member to the surface portion at a second location that is spaced at a distance from the first location, removably attaching a first support assembly to the first base member, and removably attaching a second support assembly to the second base member. The distance is less than a length of the watercraft.

In another aspect, the present disclosure is directed to an apparatus for storing a watercraft above a surface portion. The apparatus includes a first base member that is permanently attached to the surface portion at a first location, a second base member that is permanently attached to the surface portion at a second location that is spaced at a distance from the first location, a first support assembly that is removably attachable to the first base member, and a second support assembly that is removably attachable to the second base member. The distance is less than a length of the watercraft.

BRIEF DESCRIPTION OF THE DRAWINGS

FIG. 2 is an exploded, perspective view of an exemplary embodiment of the present invention;

FIG. 2A is a perspective view of an exemplary embodiment of the present invention;

FIG. 3 is an exploded, perspective view of an exemplary embodiment of the present invention;

FIG. 4A is a side view of an exemplary embodiment of the present invention;

FIG. 4B is a side view of an exemplary embodiment of the present invention;

DETAILED DESCRIPTION AND INDUSTRIAL APPLICABILITY

Figure 1:
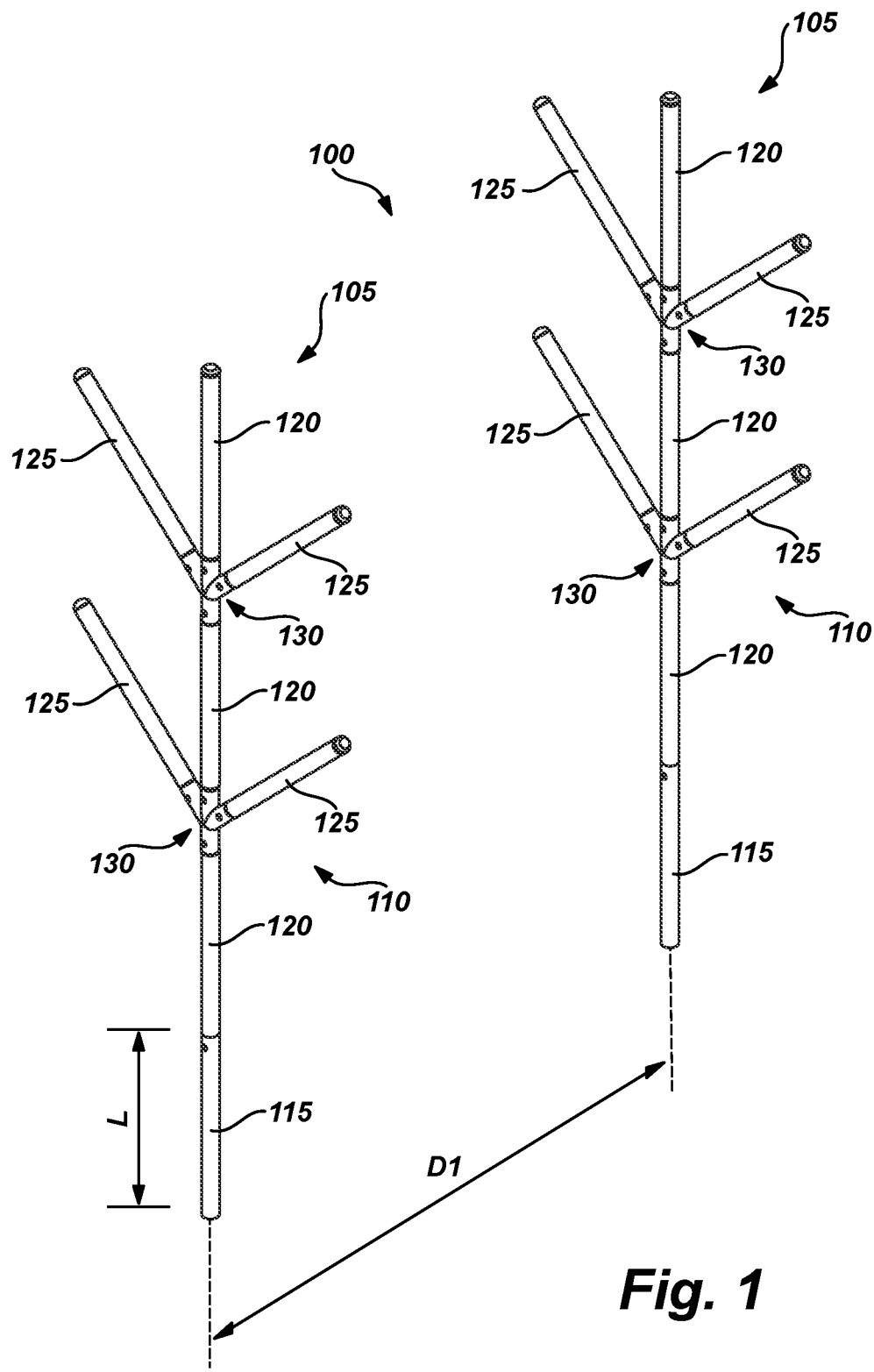
FIG. 1 is a perspective view of an exemplary embodiment of the present invention.

FIGS. 1-4B illustrate an exemplary embodiment of the exemplary disclosed system, apparatus, and method. System 100 may include one or more apparatuses 105. For example, system 100 may include a plurality of apparatuses 105. In at least some exemplary embodiments, system 100 may include two apparatuses 105. Apparatus 105 may be an assembly for storing objects such as elongated objects. For example, apparatus 105 may be used for storing watercraft and/or any other suitable elongated objects for example as described herein.

Apparatus 105 (e.g., each apparatus 105) may include a support assembly 110 and a base member 115. Base member 115 may be attached to and provide support for support assembly 110. In at least some exemplary embodiments, apparatus 105 may be a tree rack.

Support assembly 110 and base member 115 may include members formed from any suitable material for supporting elongated objects such as watercraft and/or any other suitable objects for example as described herein. Support assembly 110 and base member 115 may be formed from any suitable structural material. For example, support assembly 110 and base member 115 may be formed from metal, plastic, composite material, coated wood, and/or any other suitable structural material. Support assembly 110 and base member 115 may be formed from any suitable corrosion-proof (e.g., substantially corrosion-proof) and/or corrosion-resistant material. Support assembly 110 and base member 115 may include members having a coating such as a powder coating. Support assembly 110 and base member 115 may be galvanized. In at least some exemplary embodiments, support assembly 110 and base member 115 may be formed from steel (e.g., galvanized steel). Support assembly 110 and base member 115 may be formed from stainless steel, aluminum, Polyvinyl chloride (PVC), and/or any other suitable structural material.

Support assembly 110 may include a plurality of main members 120, a plurality of branch members 125, and one or more junction members 130. Branch members 125 may be attached to main members 120 via junction member 130. Branch members 125 may be support arms for supporting an object for example as described herein. Branch members 125 may be angled when assembled as part of support assembly 110 to provide increased support and security to objects being supported. Main members 120 may be oriented substantially vertically (e.g., vertically) when assembled as part of support assembly 110.

Main member 120 and branch member 125 may be elongated members formed from the exemplary disclosed materials above. Main member 120 and branch member 125 may be hollow members. For example, main member 120 and branch member 125 may be pipes or tubes (e.g., a structural pipe or a tube member such as a galvanized steel pipe or tube). Main member 120 and branch member 125 may have cross-sections that may be annular (e.g., circular or elliptical), rectangular (e.g., square), polygonal, and/or any other desired configuration (e.g., cross-sectional configuration). Main member 120 and branch member 125 may be any suitable structural shape such as, for example, pipe, tubes, flanged members, channels, I-beams, rods, and/or any other suitable structural shape. Main member 120 and branch member 125 may include any suitable attachment portions for example as described below. Main member 120 and branch member 125 may have any suitable length such as, for example, between about 1 foot and about 5 or 6 feet, or between about 2 feet and about 4 feet, or between about 1.5 feet and about 3 feet. Members 120 and 125 may have open ends that may be capped by cap members 122 for example as illustrated in FIG. 2. Cap members 122 may be formed from material similar to members 120 and 125 such as, for example, plastic or metal.

Junction member 130 may have any suitable shape or configuration for providing a junction or attachment between one or more main members 120 and branch members 125. Junction member 130 may be a coupling. Junction member 130 may be formed from similar material as described above regarding main member 120, branch member 125, and base member 115. Junction member 130 may be a hollow member. In at least some exemplary embodiments, junction member 130 may be a wye or double wye junction member. As illustrated in FIGS. 3 and 4B, junction member 130 may include one or more (e.g., a plurality) of branch attachment portions 135 and one or more (e.g., a plurality) of main attachment portions 140. Branch attachment portions 135 and main attachment portions 140 may be portions of an integrally formed junction member 130 or members that may be attached by any suitable technique such as, for example, welding, via mechanical fasteners such as bolts, and/or any other suitable attachment technique.

Branch attachment portion 135 may be configured to receive or be received in corresponding branch member portion 125a of branch member 125. For example, branch attachment portion 135 may be a female portion (e.g., or a male portion) that may receive (e.g., or be received in) branch member portion 125a that may be a male portion (e.g., or a female portion). Main attachment portion 140 may be configured to receive or be received in corresponding main member portion 120a of main member 120. For example, main attachment portion 140 may be a female portion (e.g., or a male portion) that may receive (e.g., or be received in) main member portion 120a that may be a male portion (e.g., or a female portion). Main member portion 120a, branch member portion 125a, branch attachment portion 135, and main attachment portion 140 may include apertures 145 for example as illustrated in FIG. 3. When main member portion 120a and main attachment portion 140 are attached (e.g., removably attached) and when branch member portion 125a and branch attachment portion 135 are attached for example as illustrated in FIG. 4B, a plurality of fastener assemblies 150 may be received in apertures 145 to attach (e.g., removably attach) main members 120 and branch members 125 to junction members 130.

Fastener assembly 150 may be formed from material similar to as described above regarding support assembly 110 and base member 115. Fastener assembly 150 may be any suitable fastener assembly such as, for example, a bolt assembly. Main members 120 and branch members 125 may be attached (e.g., removably attached) to junction members 130 via any suitable technique such as, for example, any suitable mechanical fastener, magnetic device, adhesive device, hook and loop fastener, retractable locking device, friction-fit locking device, compressible locking device, and/or any other suitable attachment device.

Support assembly 110 may be a modular assembly that may be removably attached together to form any desired configuration (e.g., as illustrated in FIG. 1). Members 120, 125, and 130 may also be removably detached from each other and stored as desired (e.g., stored in a compact form such as, for example, a bag or box). When removably detached from each other, members 120, 125, and 130 and fastener assemblies 150 may be stored in any suitable housing (e.g., housing or container such as housing 105a illustrated in FIG. 2A) having any suitable size such as, for example, between about 4"×4"×2' and about 12"×12"×4' (e.g., about 8"×8"×2.5'). Housing 105a may include a cavity formed by wall and/or door or flap members formed by any suitable materials such as the exemplary disclosed materials disclosed herein (e.g., or flexible material such as textile, cloth, or canvas). Support assembly 110 may thereby be attached together and used at a first location, and then detached and transported to a second location for use at that second location. This process may be repeated for as many iterations as desired for example as described herein. Support assembly 110 may be removably attached to base member 115 for example as described below.

Figure 5A:
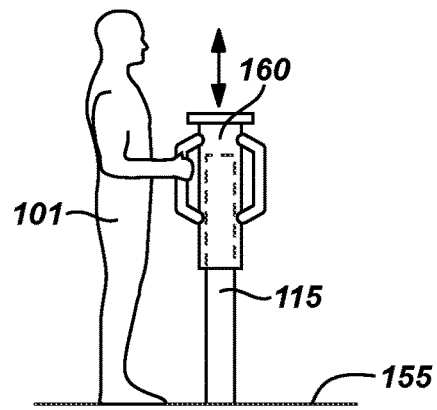
FIG. 5A is a side view of an exemplary embodiment of the present invention.
Figure 5B:
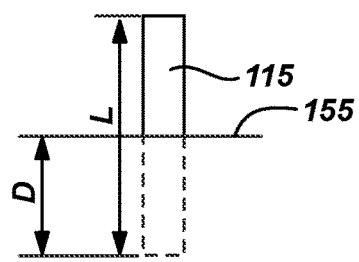
FIG. 5B is a side view of an exemplary embodiment of the present invention.
Figure 5C:
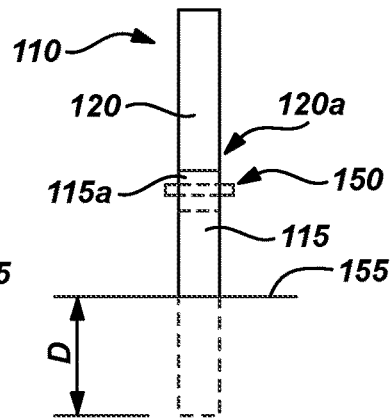
FIG. 5C is a side view of an exemplary embodiment of the present invention.

Base member 115 may be generally similar to main member 120 for example as described above. Base member 115 may be attached (e.g., attached directly) to a surface portion such as a ground surface portion 155 for example as illustrated in FIGS. 5A-5C. Ground surface portion 155 may be a dirt or soil surface, a grass surface, a sand surface such as beach sand (e.g., dry, moist, or submerged sand), or any other desired ground surface. For example, ground surface portion 155 may be located at or adjacent to a body of water in which watercraft may be used.

Base member 115 may be attached to ground surface portion 155 using any suitable technique. Base member 115 may be permanently attached to ground surface portion 155. For example, base member 115 may be attached to ground surface portion 155 so that base member 115 may not be removed without damaging base member 115 and/or removing ground surface portion 155. For example, support assembly 110 may be removably attached to base member 115 for example as described herein, but base member 115 may be permanently attached (e.g., not removably attached) to ground surface portion 155. Also in at least some exemplary embodiments, base member 115 may be removably attached to ground surface portion 155.

Base member 115 may be driven (e.g., rammed or pounded) into ground surface portion 155. For example as illustrated in FIGS. 5A-5C, base member 115 may be driven into ground surface portion 155 via a driver 160. For example, a user 101 may drive base member 115 into ground surface portion 155 by using or operating driver 160. Driver 160 may be any suitable device for driving base member 115 into ground surface portion 155 such as, for example, a post driver. For example, driver 160 may be a hydraulic post driver, a manual post driver, a pneumatic or air-driven post driver, and/or any suitable device for driving base member 115 into ground surface portion 155. Base member 115 may be driven to a depth D within ground surface portion 155. Depth D may be any suitable depth for permanently and/or fixedly attaching base member 115 to ground surface portion 155 such as, for example, between about ⅙ and about ½ of a length L of base member 115, between about ¼ and about ½ of length L, or between about ⅓ and about ½ of length L. In at least some exemplary embodiments, length L may be between about 1 foot and about 6 feet, between about 1.5 feet and about 4 feet, or between about 2 feet and about 3 feet. In at least some exemplary embodiments, depth D may be between about 4 inches and about 3 feet, between about 6 inches and about 2 feet, or between about 8 inches and about 18 inches.

Base member 115 may be attached to main member 120 similarly to as described above regarding the attachment of members 120, 125, and 130 to each other. For example as illustrated in FIG. 2, base member 115 may include a base member attachment portion 115a and an aperture 145. Base member attachment portion 115a may be configured to receive or be received in corresponding main member portion 120a of main member 120. For example, base member attachment portion 115a may be a female portion (e.g., or a male portion) that may receive (e.g., or be received in) main member portion 120a that may be a male portion (e.g., or a female portion). When main member portion 120a and base member attachment portion 115a are attached (e.g., removably attached), fastener assembly 150 may be received in apertures 145 to attach (e.g., removably attach) main member portion 120a to base member attachment portion 115a. Support assembly 110 may thereby be removably attached to base member 115 (e.g., that may be permanently attached to ground surface portion 155) based on the removable attachment of main member portion 120a to base member attachment portion 115a via fastener assembly 150. The same support assemblies 110 may be removably attached to different pluralities of base members 115 disposed at different locations. In at least some exemplary embodiments, base member 115 may provide the substantially entire (e.g., entire) structural support for support assembly 110, with no other support (e.g., from another structure such as a wall or other structural system) being provided to support assembly 110.

Figure 7:
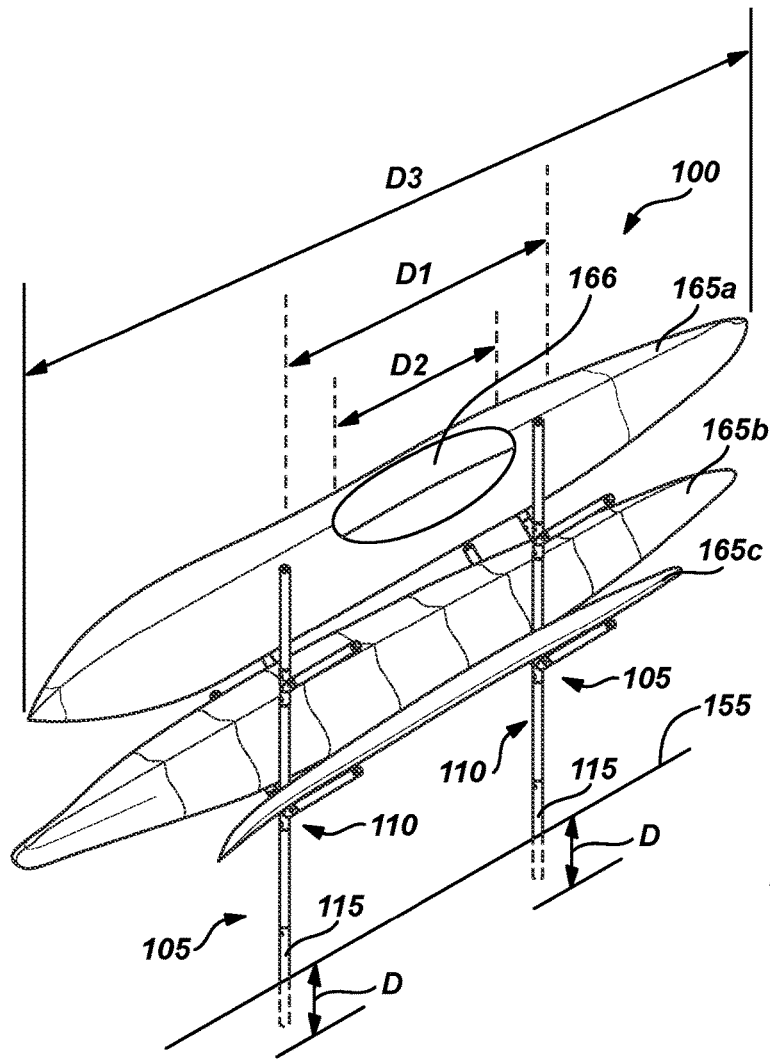
FIG. 7 is a perspective view of an exemplary embodiment of the present invention.

As illustrated in FIGS. 1 and 7, a first apparatus 105 may be spaced at an apparatus distance D1 from a second apparatus 105. Apparatus distance D1 may be measured between centerlines of apparatuses 105 (e.g., between centerlines of base members 115 and/or main members 120). Apparatus distance D1 may be any suitable distance for supporting elongated objects such as watercraft (e.g., watercraft 165a, 165b, or 165c) or any other suitable object such as for example as described herein. Watercraft 165a, 165b, and/or 165c may include a kayak, a canoe, a surfboard, a paddle board, an inflatable watercraft, a rowboat, a crew shell, and/or any other suitable type of watercraft. Apparatus distance D1 may be greater than or equal to a cockpit length D2 of a cockpit 166 of watercraft 165a, 165b, or 165c. Apparatus distance D1 may be less than an object length D3 of the object to be supported (e.g., a nose-to-nose length of watercraft 165a, 165b, or 165c). For example, apparatus distance D1 may be between about 2 feet and about 12 feet or longer, between about 3 feet and about 10 feet, between about 4 feet and about 8 feet, between about 5 feet and about 7 feet, or any other suitable distance for supporting elongated objects such as watercraft (e.g., watercraft 165a, 165b, or 165c) or any other suitable object such as for example as described herein. A user may attach (e.g., permanently attach) base members 115 to ground surface portion 155 at any desired apparatus distance D1 from each other (e.g., based on dimensions of objects to be supported such as watercraft 165a, 165b, or 165c). For example, apparatus distance D1 may be provided so that an object to be supported may be supported by at least one branch member 125 of each of two or more apparatuses 105.

The exemplary disclosed system, apparatus, and method may be used in any suitable application for storing objects such as elongated objects. For example, the exemplary disclosed system, apparatus, and method may be used for storing watercraft, equipment, apparel, clothing, and/or any other suitable objects. The exemplary disclosed system, apparatus, and method may be used to store any suitable recreational objects such as, for example, those involving water sports. The exemplary disclosed system, apparatus, and method may be used to store any suitable objects such as equipment, vehicles, and/or items used in recreational activities (e.g., water sports and other sports, camping, and/or other suitable activities), work activities (e.g., construction, security, military, and law enforcement, and/or any other suitable work or professional activities), and/or any other suitable residential, commercial, industrial, or government activities. In at least some exemplary embodiments, the exemplary disclosed system, apparatus, and method may be used for storage of personal watercraft fleets owned and operated by private or public liveries. Also, in at least some exemplary embodiments, the exemplary disclosed system, apparatus, and method may be used for resort or beach-side storage for personal watercraft for public rental.

Figure 17:
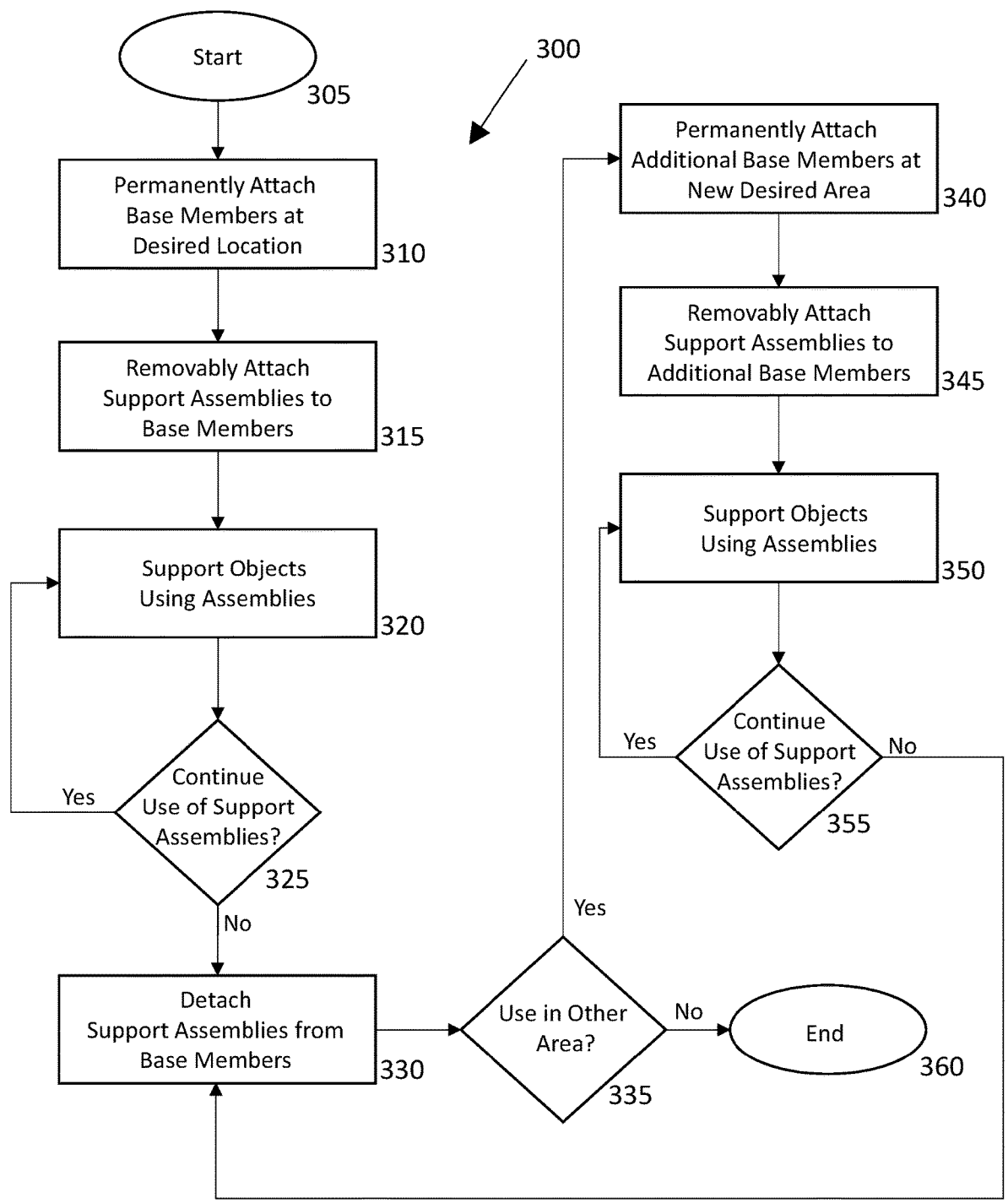
FIG. 17 illustrates an exemplary process of at least some exemplary embodiments of the present disclosure.

The flowchart of FIG. 17 illustrates an exemplary operation of the exemplary disclosed system 100. Process 300 begins at step 305. At step 310, user 101 may permanently attach one or more base members 115 to ground surface portion 155 at apparatus distance D1 between base members 115 for example as described above (e.g., as illustrated in FIGS. 5A and 5B).

Returning to FIG. 17 at step 315, user 101 may removably attach members 120, 125, and 130 of one or more support assemblies 110 together using fastener assemblies 150 and may removably attach one or more support assemblies 110 to one or more base members 115 for example as described above. For example, one or more support assemblies 110 may be modular assemblies stored in a storage bag or container (e.g., housing 105a) for example as described above. Support assemblies 110 may be removably attached to base members 115 that may be permanently attached to ground surface portion 155. At step 320 and for example as illustrated in FIG. 7, any suitable objects such as watercraft 165a, 165b, and 165c may be disposed on and supported by support assemblies 110, which may be removably attached to base members 115 that may be permanently attached to ground surface portion 155.

Returning to FIG. 17 at step 325, user 101 may determine whether or not to continue to use support assemblies 115 to support objects at a given area. If use is to be continued, process 300 may return to step 320. If use is not to be continued, process 300 may proceed to step 330.

At step 330, support assemblies 110 may be detached from base member 115 for example by unfastening fastener assemblies 150. Members 120, 125, and 130 of support assemblies 110 may be detached from each other and for example stored in any suitable container (e.g., housing 105a) for example as described herein. Base members 115 may remain permanently attached to ground surface portion 155.

At step 335, user 101 may determine whether or not to use support assembly 110 in another area (e.g., geographic area or location). If support assembly 110 is to be used in another area, process 300 proceeds to step 340.

At step 340, user 101 may transport support assembly 110 to the new area (e.g., geographic area or location). If additional base members 115 have not yet been permanently attached to ground surface portion 155 at the new area, user 101 may permanently attach the additional base members 115 at the new area similarly to as described above at step 310. Alternatively for example, user 101 may utilize exiting additional base members 115 that have been permanently attached to ground surface portion 155 at the new area. Accordingly for example, a plurality of base members 115 may be permanently attached to ground surface portion 155 at each of multiple areas, and a same support assembly 110 may be used at and moved between the multiple areas (e.g., geographic areas or locations).

At step 345, user 101 may removably attach one or more support assemblies 110 to one or more additional base members 115 at the new area similarly to as described above at step 315. Objects may be supported at step 350 similarly to as described above at step 320.

At step 355, user 101 may determine whether or not to continue to use support assemblies 115 to support objects at the new area. If use is to be continued, process 300 may return to step 350. If use is not to be continued, process 300 may return to step 330, at which support assemblies 310 may be detached from base members 115 and members 120, 125, and 130 may be detached from each other as described above. Steps 320 through 355 may be repeated for as many iterations as desired, with the same or multiple support assemblies 110 being utilized at and moved between as many areas (e.g., each having base members 115 permanently attached to ground surface portion 155) as desired.

At step 335, if a given support assembly 110 is not to be used in another area, process 300 ends at step 360. The additional exemplary embodiments described below may be used similarly as described above regarding process 300.

Figure 7A:
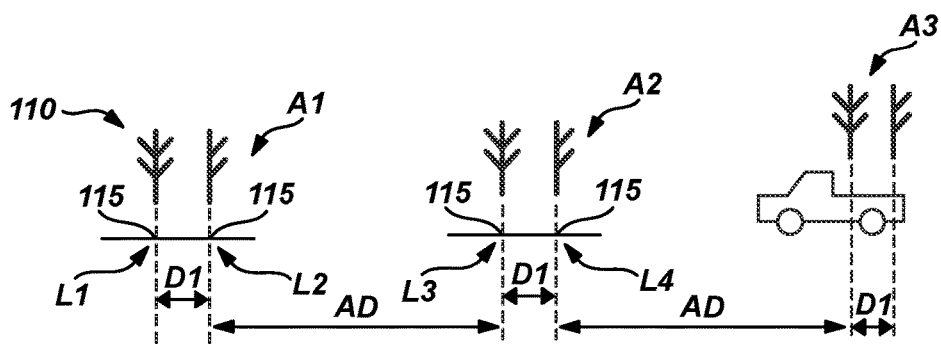
FIG. 7A is a schematic view of an exemplary embodiment of the present invention.

FIG. 7A illustrates an exemplary embodiment of the exemplary disclosed system, apparatus, and method. For example, FIG. 7A illustrates a plurality of different configurations of the exemplary disclosed support assembly (e.g., having a varying number of branch members on one or both sides). The exemplary disclosed method may include permanently attaching a first base member to the surface portion at a first location (e.g., a first location L1) of a first area (e.g., a first area A1), permanently attaching a second base member to the surface portion at a second location (e.g., a second location L2) of the first area that may be spaced at a first distance (e.g., apparatus distance D1) from the first location, removably attaching a first support assembly to the first base member, and removably attaching a second support assembly to the second base member. The exemplary disclosed method may also include permanently attaching a third base member to the surface portion at a third location (e.g., a third location L3) of a second area (e.g., a second area A2), permanently attaching a fourth base member to the surface portion at a fourth location (e.g., a fourth location L4) of the second area that may be spaced at a second distance (e.g., apparatus distance D1) from the third location, removably attaching the first support assembly to the third base member, and removably attaching the second support assembly to the fourth base member. The first distance and the second distance may each be less than a length of the watercraft. First area A1 may be separated by an area distance AD from second area A2. Area distance AD may be any suitable distance such as, for example, up to hundreds or thousands of feet, a mile, several miles, or hundreds of miles or more. FIG. 7A also illustrates a third area A3 that may for example include a vehicle and base members that may be similar to as described below regarding FIGS. 8 and 9.

Figure 6A:
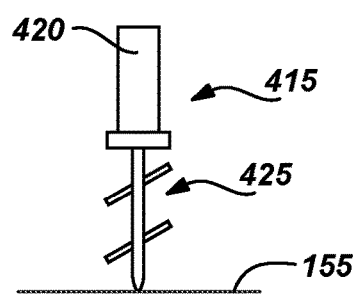
FIG. 6A is a side view of an exemplary embodiment of the present invention.
Figure 6B:
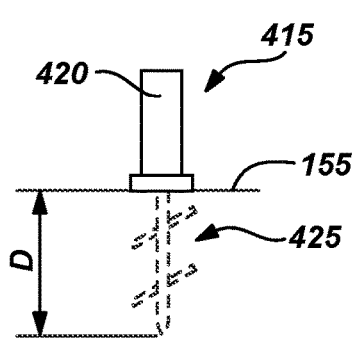
FIG. 6B is a side view of an exemplary embodiment of the present invention.
Figure 6C:
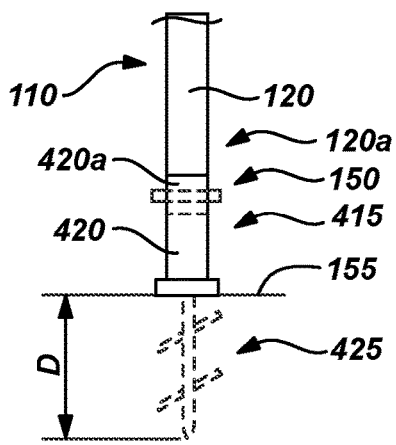
FIG. 6C is a side view of an exemplary embodiment of the present invention.

FIGS. 6A, 6B, and 6C illustrate another exemplary embodiment of the exemplary disclosed system, apparatus, and method. A base member 415 may be formed from similar materials as base member 115. Base member 415 may include a shaft 420 that may be similar to base member 115 and that may include a base member attachment portion 420a that may be similar to base member attachment portion 115a. Base member attachment portion 420a may be removably attached to main member 120 (e.g., main member portion 120a) of support assembly 110 similarly to the connection of base member attachment portion 115a to main member portion 120a of main member 120 described above.

Base member 415 may also include a helical shaft 425. Helical shaft 425 may be for example an auger bit, a helical pile, a screw pile, and/or any other suitable configuration for being screwed into ground surface portion 155. Base member 415 may be permanently attached to ground surface portion 155 based on base member 415 being driven (e.g., screwed) to depth D. Base members 415 may be used with system 100 similarly to base members 115 described above. In at least some exemplary embodiments, base members 415 may be placed into ground surface portion 155 that may be submerged (e.g., may be a ground surface under water) and spun into place in ground surface portion 155. Helical shaft 425 may be a sand auger end portion that may be attached by any suitable technique (for example as described herein) to shaft 420.

Figure 8:
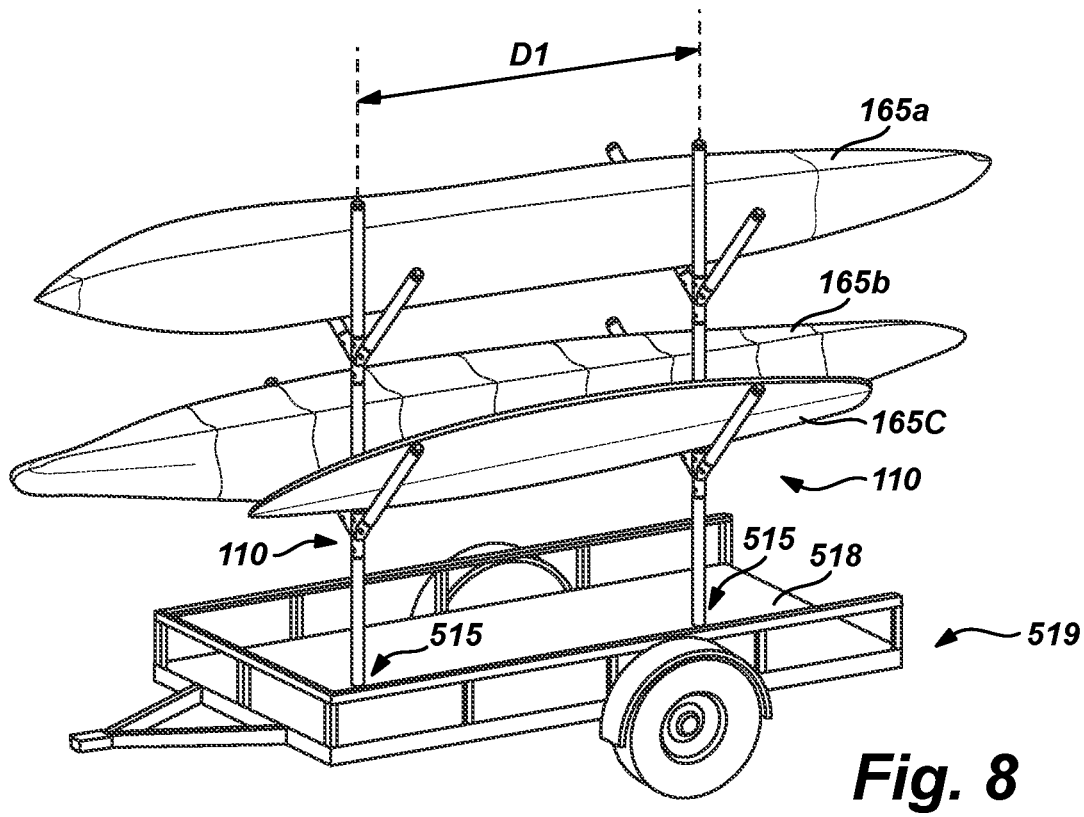
FIG. 8 is a perspective view of an exemplary embodiment of the present invention.
Figure 9:
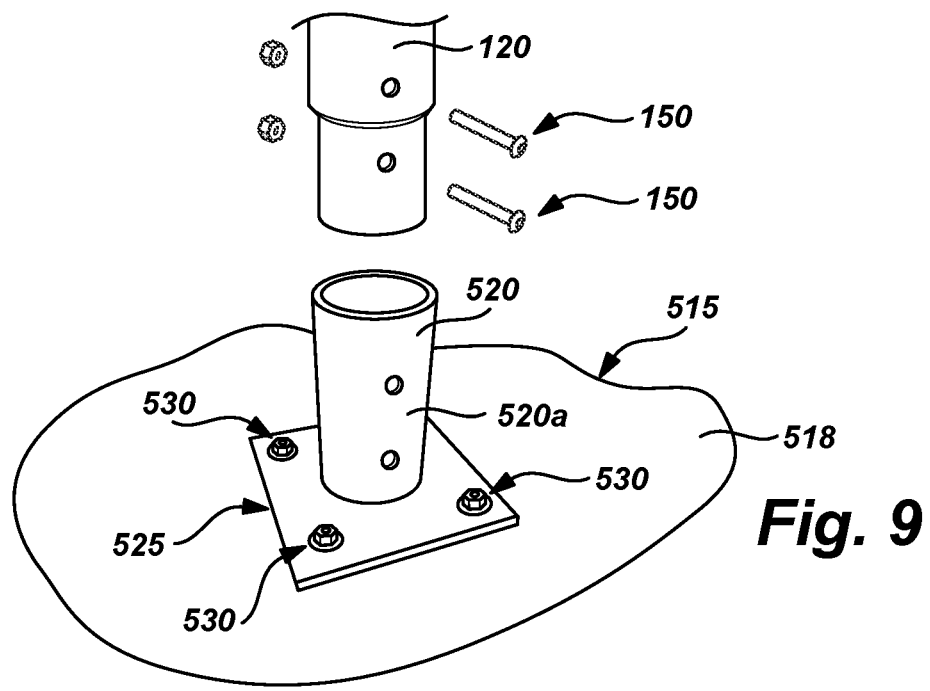
FIG. 9 is an exploded, perspective view of an exemplary embodiment of the present invention.
Figure 10:
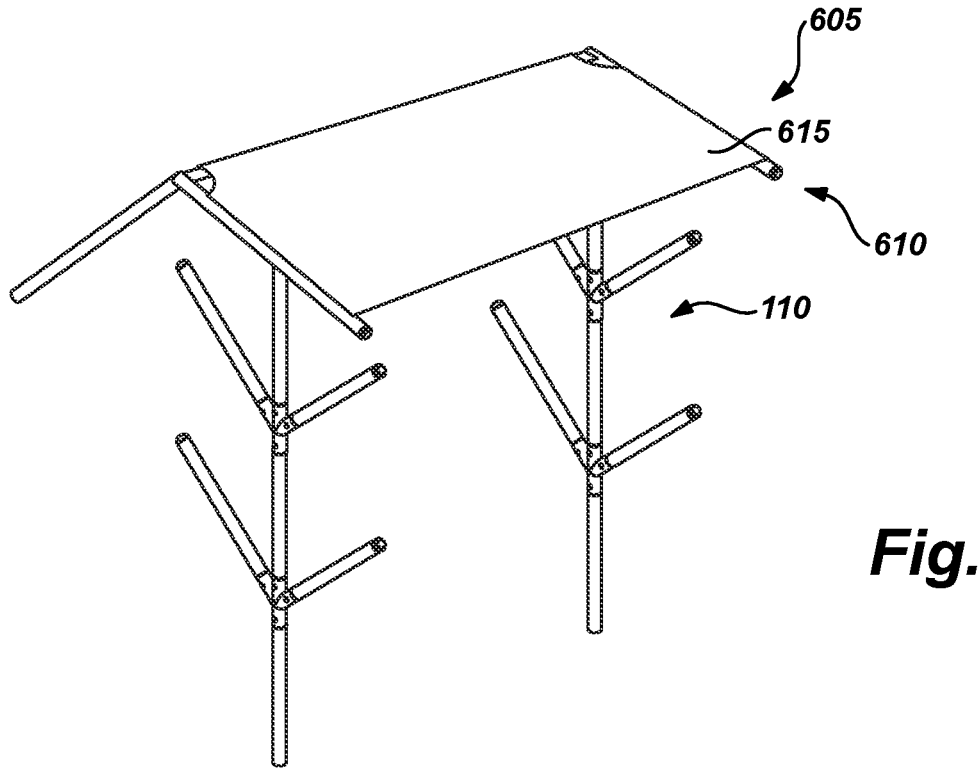
FIG. 10 is a perspective view of an exemplary embodiment of the present invention.
Figure 11:
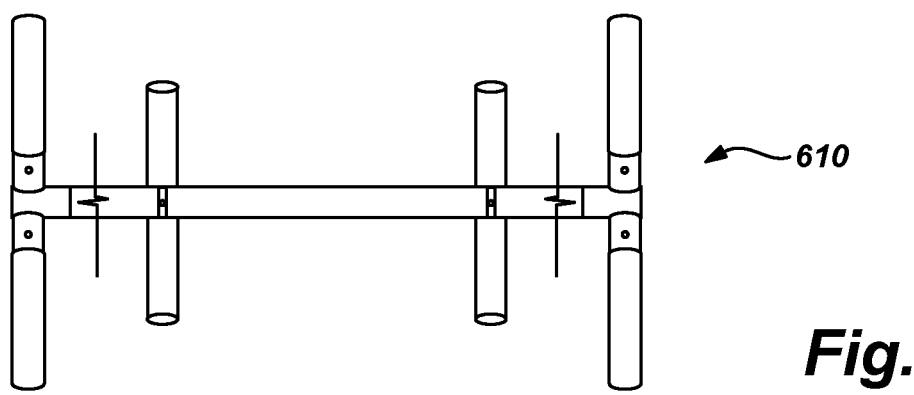
FIG. 11 is a top view of an exemplary embodiment of the present invention.
Figure 12:
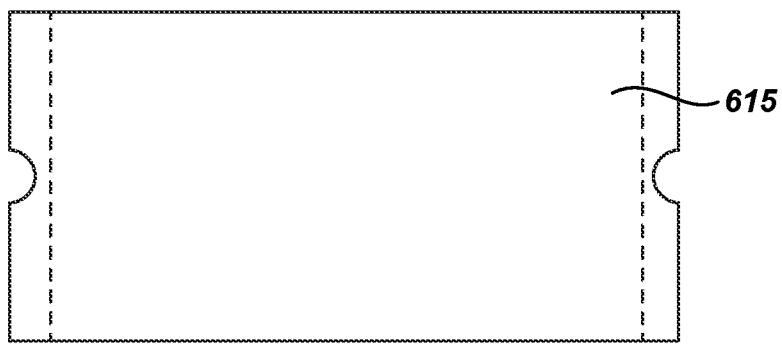
FIG. 12 is a top view of an exemplary embodiment of the present invention.
Figure 13:
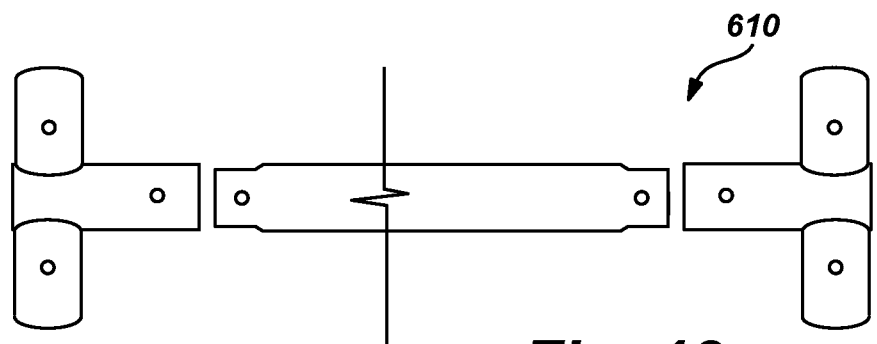
FIG. 13 is a top view of an exemplary embodiment of the present invention.
Figure 14:
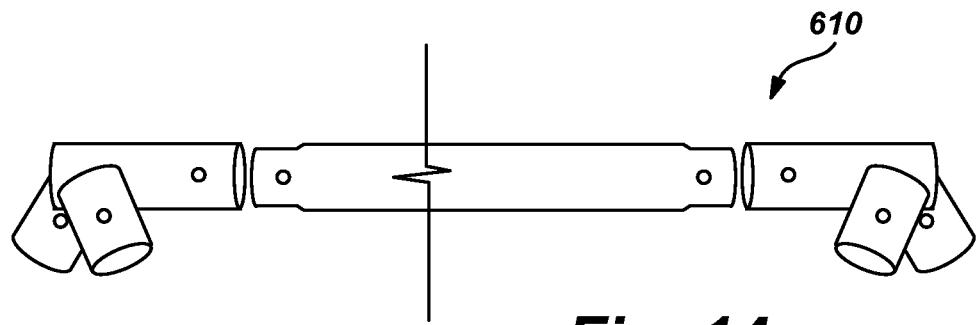
FIG. 14 is a side view of an exemplary embodiment of the present invention.

FIGS. 8 and 9 illustrate another exemplary embodiment of the exemplary disclosed system, apparatus, and method. A base member 515 may be formed from similar materials as base member 115. Base member 515 may include a shaft 520 that may be similar to base member 115 and may include a base member attachment portion 520a that may be similar to base member attachment portion 115a. Base member attachment portion 520a may be removably attached to main member 120 (e.g., main member portion 120a) of support assembly 110 similarly to the connection of base member attachment portion 115a to main member portion 120a of main member 120 described above.

Base member 515 may also include an attachment plate 525. Attachment plate 525 may be a base plate formed from material similar to members 120, 125, and 130 of apparatus 105 for example as described above. Attachment plate 525 may be permanently attached to a platform 518 of a vehicle 519. Platform 518 may be a deck of a trailer, a deck of a flatbed truck, a surface of a vehicle, or any other suitable surface for attachment to attachment plate 525. Base members 515 may be spaced at apparatus distance D1. Attachment plate 525 may be permanently attached to platform 518 by welding, permanent bolt assemblies 530 (e.g., that may be tightened with suitable torque for a permanent attachment of permanent bolt assemblies 530 through apertures of platform 518), and/or any other suitable permanent attachment technique. Base members 515 may be used with system 100 similarly to base member 115 described above.

FIGS. 10-16 illustrate another exemplary embodiment of the exemplary disclosed system, apparatus, and method. A cover assembly 605 may be removably attached to support assembly 110 similarly to the exemplary disclosed removably attachment of members of support assembly 110. Cover assembly 605 may include a frame assembly 610 and a cover 615. Frame assembly 610 may be formed from a plurality of members that may be generally similar to members 120, 125, and 130. Members of frame assembly 610 may be modular and may be removably attached together, detached, stored (e.g., in any suitable housing or container such as housing 105a), and transported similarly to as described above regarding members 120, 125, and 130.

Cover 615 may be supported by frame assembly 610. Cover 615 may be a canopy or any other suitable covering for example to provide protection from the sun, precipitation, and/or other weather conditions. Cover 615 may be formed from fabric, textile, or other suitable canopy material. For example, cover 615 may be formed from polyester, polycotton, cotton, canvas, nylon, and/or any other suitable canopy materials.

Figure 15:
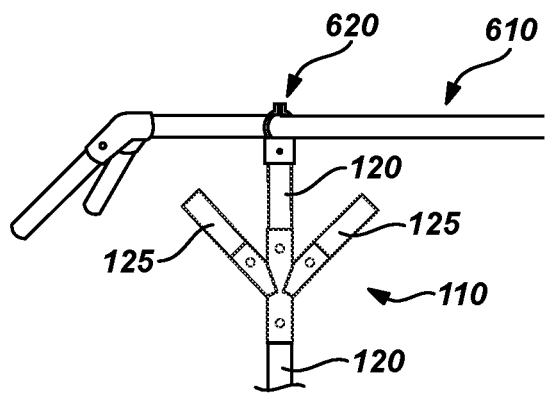
FIG. 15 is a side view of an exemplary embodiment of the present invention.
Figure 16:
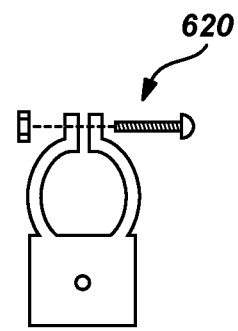
FIG. 16 is a side view of an exemplary embodiment of the present invention.

Cover assembly 605 may be removably attached to support assembly 110 similarly to the exemplary disclosed removable attachment described above regarding apparatus 105. Also for example as illustrated in FIGS. 15 and 16, cover assembly 605 may be removably attached to one or more support assemblies 110 via one or more fasteners 620. Fastener 620 may removably attach a member of frame assembly 610 to main member 120 of support assembly 110 for example as illustrated in FIG. 15. Fastener 620 may be a mechanical fastener, a magnetic fastener, an adhesive fastener, or any other suitable type of fastener. In at least some exemplary embodiments and as illustrated in FIG. 16, fastener 620 may be a clamp assembly that may be attached to main member 120 (e.g., via fastener assembly 150) and may clamp around any suitable member of frame assembly 610.

In at least some exemplary embodiments, the exemplary disclosed system, apparatus, and method may include a personal watercraft storage rack system. The exemplary disclosed system, apparatus, and method may provide a permanent (e.g., including permanent base members), all-weather storage system for personal watercraft that may allow for watercraft to be stored inverted and off the ground to allow for protection from rain pooling and pests. The system may provide a small footprint and profile (e.g., two base members 115) to work around while still providing suitable stability. For example, bridging a personal watercraft between apparatuses 105 may provide horizontal stability for the watercraft. When not in use or empty, the system may provide a low-profile frame that reduces visual obstruction of a waterfront view. The system may be modular so that the system may be modified for a desired placement location and watercraft count. The system may be configured for placement in water, ground, sand, or a trailer. Apparatus distance D1 may be provided (e.g., two points of contact) to support any desired length of watercraft. Different finishes (e.g., coverings or layers) may be applied to provide a desired custom look.

In at least some exemplary embodiments, the exemplary disclosed method may be a method for storing a watercraft above a surface portion. The exemplary disclosed method may include permanently attaching a first base member (e.g., base member 115, base member 415, or base member 515) to the surface portion at a first location, permanently attaching a second base member (e.g., base member 115, base member 415, or base member 515) to the surface portion at a second location that is spaced at a distance from the first location, removably attaching a first support assembly (e.g., support assembly 110) to the first base member, and removably attaching a second support assembly (e.g., support assembly 110) to the second base member. The distance may be less than a length of the watercraft. The exemplary disclosed method may also include supporting the watercraft above the surface portion using the first support assembly attached to the first base member and the second support assembly attached to the second base member. Each of the first support assembly and the second support assembly may be a modular assembly including a plurality of members that are removably attachable to each other. Permanently attaching the first and second base members may include attaching the first and second base members so that the first and second base members are unremovable from the surface portion except by damaging the first and second base members or removing the surface portion. The exemplary disclosed method may further include removably attaching and detaching a plurality of members of each of the first and second support assemblies and storing the detached plurality of members in a housing. Permanently attaching the first and second base members to the surface portion may include driving the first and second base members into the surface portion that may be a ground surface portion using a post driver. Permanently attaching the first and second base members to the surface portion may include screwing the first and second base members that each include an auger bit into the surface portion that is a sand surface portion. Permanently attaching the first and second base members to the surface portion may include welding or permanently bolting a base plate of the first and second base members to a platform of a vehicle. The distance may be greater than a cockpit length of the watercraft. The watercraft may be a kayak, a canoe, a surfboard, a paddle board, an inflatable watercraft, a rowboat, or a crew shell.

In at least some exemplary embodiments, the exemplary disclosed apparatus may be an apparatus for storing a watercraft above a surface portion. The exemplary disclosed apparatus may include a first base member (e.g., base member 115, base member 415, or base member 515) that may be permanently attached to the surface portion at a first location, a second base member (e.g., base member 115, base member 415, or base member 515) that may be permanently attached to the surface portion at a second location that is spaced at a distance from the first location, a first support assembly (e.g., support assembly 110) that may be removably attachable to the first base member, and a second support assembly (e.g., support assembly 110) that may be removably attachable to the second base member. The distance may be less than a length of the watercraft. Each of the first support assembly and the second support assembly may be a modular assembly including a plurality of members that are removably attachable to each other. The exemplary disclosed apparatus may also include a plurality of junction members configured to removably attach the plurality of members together, wherein the plurality of junction members may include at least one selected from the group of a wye junction member, a double wye junction member, and combinations thereof. The exemplary disclosed apparatus may further include a frame assembly that may be removably attachable to the first and second support assemblies, wherein the frame assembly may support a canopy.

In at least some exemplary embodiments, the exemplary disclosed method may be a method for storing a watercraft above a surface portion. The exemplary disclosed method may include permanently attaching a first base member (e.g., base member 115, base member 415, or base member 515) to the surface portion at a first location of a first area, permanently attaching a second base member (e.g., base member 115, base member 415, or base member 515) to the surface portion at a second location of the first area, the second location spaced at a first distance from the first location, removably attaching a first support assembly (e.g., support assembly 110) to the first base member, removably attaching a second support assembly (e.g., support assembly 110) to the second base member, permanently attaching a third base member to the surface portion at a third location of a second area, permanently attaching a fourth base member to the surface portion at a fourth location of the second area, the fourth location spaced at a second distance from the third location, removably attaching the first support assembly to the third base member, and removably attaching the second support assembly to the fourth base member. The first distance and the second distance may each be less than a length of the watercraft. The exemplary disclosed method may also include supporting the watercraft above the surface portion using the first support assembly attached to the first base member and the second support assembly attached to the second base member, and supporting the watercraft above the surface portion using the first support assembly attached to the third base member and the second support assembly attached to the fourth base member. The exemplary disclosed method may further include detaching the first and second support assemblies from the first and second base members and transporting the first and second support assemblies from the first area to the second area. The exemplary disclosed method may also include transporting a plurality of detached members of the first and second support assemblies between the first area and the second area, the plurality of detached members being stored in a housing during transport. The exemplary disclosed method may further include removing the first, second, third, and fourth base members by either damaging the first, second, third, and fourth base members or removing the surface portion at the first, second, third, and fourth locations. Permanently attaching the first, second, third, and fourth base members includes at least one selected from the group of driving into the surface portion that is a ground surface portion using a post driver, screwing an auger bit into the surface portion that is a sand surface portion, welding or permanently bolting a base plate to a platform of a vehicle, and combinations thereof.

In at least some exemplary embodiments, the exemplary disclosed system, apparatus, and method may provide an efficient and effective system for storing objects such as watercraft. The exemplary disclosed system, apparatus, and method may also provide a simple, affordable, and weather-resistant storage solution for safe and protective storage of personal watercraft, which may have a relatively small footprint. The exemplary disclosed system, apparatus, and method may provide an efficient and effective system for storing watercraft at a large variety of different areas that may or may not have existing structures.

It will be apparent to those skilled in the art that various modifications and variations can be made to the exemplary disclosed system, apparatus, and method. Other embodiments will be apparent to those skilled in the art from consideration of the specification and practice of the exemplary disclosed apparatus, system, and method. It is intended that the specification and examples be considered as exemplary, with a true scope being indicated by the following claims.

What is claimed is:

1. A method for storing a watercraft above a surface portion, comprising:
    driving or screwing a first base member into the surface portion at a first location;
    driving or screwing a second base member into the surface portion at a second location that is spaced at a distance from the first location;
    removably attaching a first support assembly to the first base member; and
    removably attaching a second support assembly to the second base member;
    wherein the distance is less than a length of the watercraft;
    wherein the surface portion is dirt, soil, grass, or sand;
    wherein the first and second support assemblies are supported entirely above the surface portion when removably attached to the first and second base members; and
    wherein driving or screwing the first and second base members includes driving or screwing the first and second base members to a depth into the surface portion that is between ¼ and ½ of a length of the first and second base members.

2. The method of claim 1, further comprising supporting the watercraft above the surface portion using the first support assembly attached to the first base member and the second support assembly attached to the second base member.

3. The method of claim 1, wherein each of the first support assembly and the second support assembly is a modular assembly including a plurality of members that are removably attachable to each other.

4. The method of claim 1, further comprising removably attaching and detaching a plurality of members of each of the first and second support assemblies and storing the detached plurality of members in a housing.

5. The method of claim 1, wherein driving or screwing the first and second base members to the surface portion includes driving the first and second base members into the surface portion to a depth into the ground surface that is between ⅓ and ½ of a length of the first and second base members using a post driver.

6. The method of claim 1, wherein driving or screwing the first and second base members to the surface portion includes screwing the first and second base members that each include an auger bit into the surface portion to a depth into the ground surface that is between ⅓ and ½ of a length of the first and second base members.

7. The method of claim 1, wherein the distance is greater than a cockpit length of the watercraft.

8. The method of claim 1, wherein the watercraft is a kayak, a canoe, a surfboard, a paddle board, an inflatable watercraft, a rowboat, or a crew shell.

9. An apparatus for supporting a watercraft using a vehicle and also above a surface portion that is dirt, soil, grass, or sand, comprising:
a first vehicle base member configured to be permanently attached to the vehicle;
a second vehicle base member configured to be permanently attached to the vehicle;
a first base member that is driven or screwed into the surface portion at a first location;
a second base member that is driven or screwed into the surface portion at a second location that is spaced at a distance from the first location;
a first support assembly that is removably attachable to the first vehicle base member and the first base member; and
a second support assembly that is removably attachable to the second vehicle base member and the second base member;
wherein the first and second support assemblies are supported entirely above the surface portion when removably attached to the first and second base members.

10. The apparatus of claim 9, wherein each of the first support assembly and the second support assembly is a modular assembly including a plurality of members that are removably attachable to each other.

11. The apparatus of claim 10, further comprising a plurality of junction members configured to removably attach the plurality of members together;
wherein the plurality of junction members includes at least one selected from the group of a wye junction member, a double wye junction member, and combinations thereof.

12. The apparatus of claim 9, further comprising a frame assembly that is removably attachable to the first and second support assemblies;
wherein the frame assembly supports a canopy.

13. A method for storing a watercraft above a surface portion, comprising:
driving or screwing a first base member into the surface portion at a first location of a first area;
driving or screwing a second base member Ma into the surface portion at a second location of the first area, the second location spaced at a first distance from the first location;
removably attaching a first support assembly to the first base member;
removably attaching a second support assembly to the second base member;
driving or screwing a third base member into the surface portion at a third location of a second area;
driving or screwing a fourth base member into the surface portion at a fourth location of the second area, the fourth location spaced at a second distance from the third location;
removably attaching the first support assembly to the third base member;
removably attaching the second support assembly to the fourth base member;
permanently attaching a first vehicle base member and a second vehicle base member to a vehicle;
removably attaching the first support assembly to the first vehicle base member;
removably attaching the second support assembly to the second vehicle base member; and
moving the vehicle between the first area and the second area when the first and second support assemblies are removably attached to the first and second vehicle base members;
wherein the first distance and the second distance are each less than a length of the watercraft;
wherein the surface portion is dirt, soil, grass, or sand; and
wherein the first and second support assemblies are supported entirely above the surface portion when removably attached to either the first and second base members or the third and fourth base members.

14. The method of claim 13, further comprising:
supporting the watercraft above the surface portion using the first support assembly attached to the first base member and the second support assembly attached to the second base member; and
supporting the watercraft above the surface portion using the first support assembly attached to the third base member and the second support assembly attached to the fourth base member.

15. The method of claim 13, further comprising detaching the first and second support assemblies from the first and second base members, removably attaching the first and second support assemblies to the first and second vehicle base members, and supporting the watercraft on the vehicle on the first and second support assemblies while moving from the first area to the second area.

16. The method of claim 15, further comprising transporting the watercraft to the second area, removing the watercraft from the vehicle and detaching the first and second support assemblies from the first and second vehicle base members, and attaching the first and second support assemblies to the third and fourth base members at the second area.

17. The method of claim 1, wherein attachment portions of the first and second support assemblies to the first and second base members are disposed entirely above the surface portion, the attachment portions being spaced from the surface portion.

18. The method of claim 17, wherein the attachment portions are bolted connections disposed entirely above the surface portion and attached to pipes or tubes of the first and second support assemblies that are disposed entirely above the surface portion when removably attached to the first and second base members, the attachment portions being spaced from the surface portion.

19. The method of claim 1, wherein the surface portion is beach sand.

20. The method of claim 13, wherein:
the first vehicle base member is spaced a third distance on the vehicle from the second vehicle base member; and
the third distance is less than the length of the watercraft.

* * * * *